(12) United States Patent
Tokizaki

(10) Patent No.: US 11,955,150 B1
(45) Date of Patent: Apr. 9, 2024

(54) DISK DEVICE INCLUDING DAMPER TO ATTENUATE VIBRATION

(71) Applicants: Kabushiki Kaisha Toshiba, Tokyo (JP); Toshiba Electronic Devices & Storage Corporation, Tokyo (JP)

(72) Inventor: Tomoyuki Tokizaki, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/179,707

(22) Filed: Mar. 7, 2023

(30) Foreign Application Priority Data

Sep. 21, 2022 (JP) ................. 2022-150341

(51) Int. Cl.
*G11B 5/48* (2006.01)
*G11B 33/08* (2006.01)

(52) U.S. Cl.
CPC .......... *G11B 5/4833* (2013.01); *G11B 5/4813* (2013.01); *G11B 33/08* (2013.01)

(58) Field of Classification Search
CPC ...... G11B 5/4833; G11B 33/08; G11B 5/4813
See application file for complete search history.

(56) References Cited

U.S. PATENT DOCUMENTS

| | | | |
|---|---|---|---|
| 5,801,905 A * | 9/1998 | Schirle | G11B 5/4833 360/265.9 |
| 7,133,259 B2 | 11/2006 | Takagi et al. | |
| 7,636,222 B1 * | 12/2009 | Dobosz | G11B 5/5569 360/265.9 |
| 7,859,795 B2 * | 12/2010 | Kerner | G11B 5/5526 360/244.9 |
| 7,929,245 B2 * | 4/2011 | Hanrahan | G11B 33/08 360/97.19 |
| 7,929,254 B2 * | 4/2011 | Soga | G11B 5/4833 360/266 |
| 8,345,387 B1 * | 1/2013 | Nguyen | G11B 5/4833 360/265.9 |
| 8,432,641 B1 * | 4/2013 | Nguyen | G11B 5/4833 360/265.9 |
| 9,368,129 B1 * | 6/2016 | Hahn | G11B 3/12 |
| 11,341,997 B2 * | 5/2022 | Tokizaki | G11B 19/2018 |
| 2003/0202284 A1 * | 10/2003 | Arya | G11B 5/484 |

(Continued)

FOREIGN PATENT DOCUMENTS

JP H11-185415 A 7/1999

*Primary Examiner* — Brian E Miller
(74) *Attorney, Agent, or Firm* — Kim & Stewart LLP

(57) ABSTRACT

According to one embodiment, a disk device includes magnetic disks, a first head gimbal assembly, a first damper, and a carriage. The first head gimbal assembly includes a first magnetic head, a first load beam, and a first base plate. The first load beam supports the first magnetic head. The first base plate is connected to the first load beam. The first damper includes a first viscoelastic material, and a first member attached to the first viscoelastic material. The carriage rotates about a rotation axis to move the first magnetic head along a recording surface of a first magnetic disk. The carriage includes an arm, and a first flat surface of the arm. The first flat surface faces the recording surface of the first magnetic disk. The first base plate and the first viscoelastic material are fixed to the first flat surface.

16 Claims, 8 Drawing Sheets

(56) References Cited

U.S. PATENT DOCUMENTS

| | | | | |
|---|---|---|---|---|
| 2005/0094311 | A1* | 5/2005 | Boss | G11B 33/08 |
| 2008/0151433 | A1* | 6/2008 | Soga | G11B 5/4833 |
| | | | | 360/254 |
| 2008/0158725 | A1* | 7/2008 | Hirano | G11B 5/4833 |
| | | | | 360/240 |
| 2013/0155547 | A1* | 6/2013 | Eguchi | G11B 5/4833 |
| | | | | 360/99.08 |
| 2022/0084553 | A1* | 3/2022 | Tokizaki | G11B 19/2018 |
| 2022/0230662 | A1* | 7/2022 | Tokizaki | G11B 5/4813 |
| 2022/0262394 | A1* | 8/2022 | Okamoto | G11B 5/4833 |

* cited by examiner

DISK DEVICE INCLUDING DAMPER TO ATTENUATE VIBRATION

CROSS-REFERENCE TO RELATED APPLICATIONS

This application is based upon and claims the benefit of priority from Japanese Patent Application No. 2022-150341, filed on Sep. 21, 2022, the entire contents of which are incorporated herein by reference.

FIELD

Embodiments described herein relate generally to a disk device.

BACKGROUND

Disk devices such as a hard disk drive includes a head gimbal assembly (HGA) and a carriage. The HGA includes magnetic heads that read and write information from and to the corresponding magnetic disks, and is attached to an arm of the carriage. The carriage rotates to move the magnetic heads to a desired position.

The positioning control of the magnetic head may be affected by the vibration of the arm. For this reason, the disk device may include a damper attached to the arm to attenuate the vibration of the arm.

In a disk device the magnetic disks are stacked on top of each other with a gap. The interval between every two adjacent magnetic disks is set to allow the arm to be inserted in-between them. Attaching the damper to the arm typically increases the interval between the adjacent magnetic disks.

DETAILED DESCRIPTION

In general, according to one embodiment, a disk device includes a plurality of magnetic disks, a first head gimbal assembly, a first damper, and a carriage. The plurality of magnetic disks each has a recording surface. The first head gimbal assembly includes a first magnetic head, a first load beam, and a first base plate. The first magnetic head is configured to read and write information from and to a first magnetic disk of the plurality of magnetic disks. The first load beam supports the first magnetic head. The first base plate is connected to the first load beam. The first damper includes a first viscoelastic material, and a first member. The first member is attached to the first viscoelastic material and has higher rigidity than the first viscoelastic material. The carriage is configured to rotate about a rotation axis to move the first magnetic head along the recording surface of the first magnetic disk. The carriage includes an arm, and a first flat surface of the arm. The first flat surface is configured to face the recording surface of the first magnetic disk. The first base plate and the first viscoelastic material are fixed to the first flat surface.

First Embodiment

Hereinafter, a first embodiment will be described with reference to FIGS. 1 to 5. Note that, in the present specification, components according to embodiments and descriptions of the components may be described in a plurality of expressions. The components and the descriptions thereof are examples, and are not limited by the expression of the present specification. The components may also be identified with names different from those herein. In addition, the component may be described by an expression different from the expression in the present specification.

Figure 1:
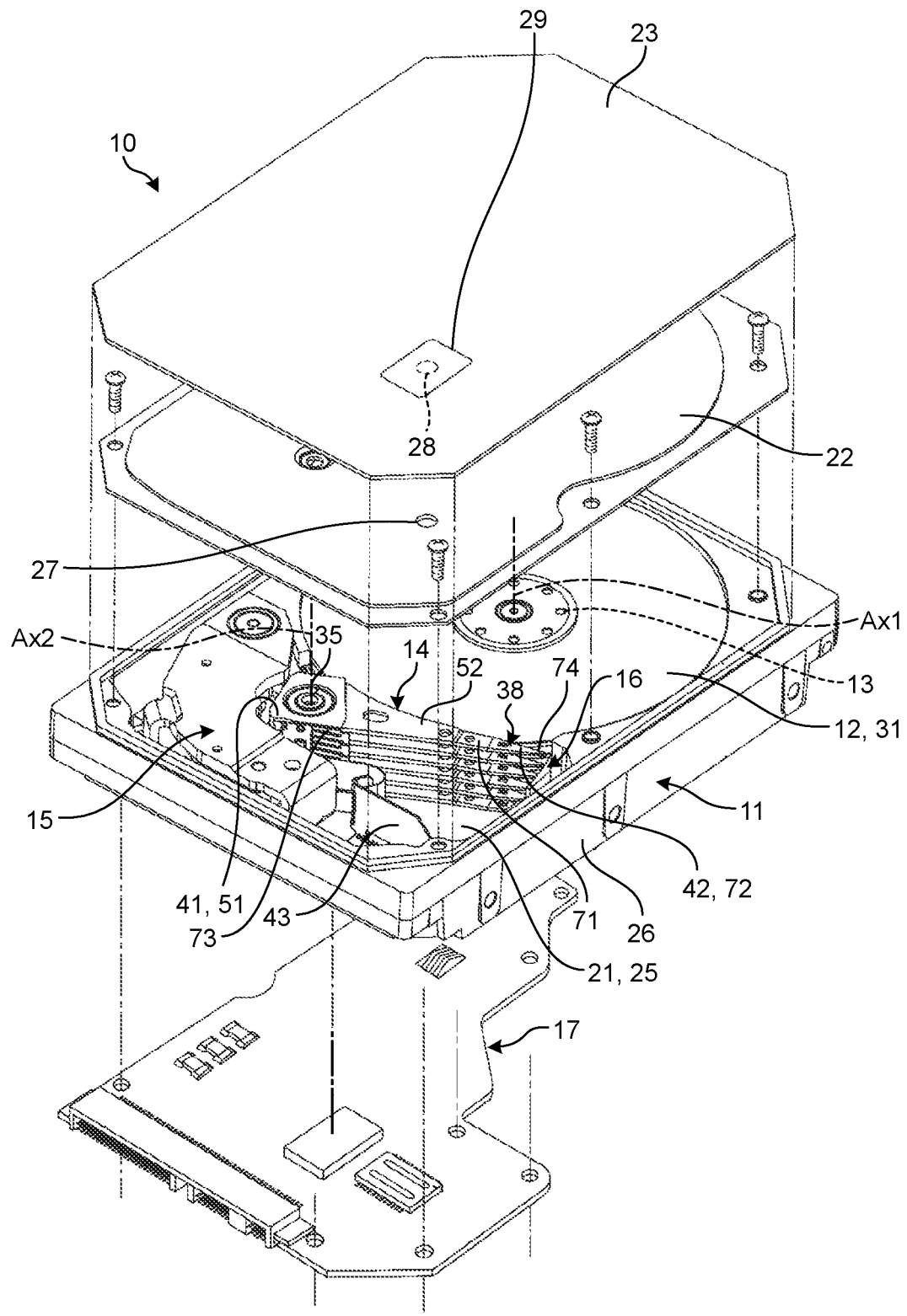
FIG. 1 is an exemplary perspective view illustrating a hard disk drive (HDD) according to a prior art in an exploded manner.

FIG. 1 is an exemplary perspective view illustrating a hard disk drive (HDD) according to a prior art in an exploded manner. The HDD 10 according to the first embodiment is an example of a disk device, and may also be referred to as an electronic device, a storage device, an external storage device, or a magnetic disk device. The HDD 10 is, for example, a near-online HDD, and is mounted on a rack of a server. Note that the HDD 10 is not limited to this example.

As illustrated in FIG. 1, the HDD 10 includes a housing 11, a plurality of magnetic disks 12, a spindle motor 13, a head stack assembly (HSA) 14, a voice coil motor (VCM) 15, a ramp load mechanism 16, and a printed circuit board (PCB) 17. Note that the HDD 10 is not limited to this example.

Figure 2:
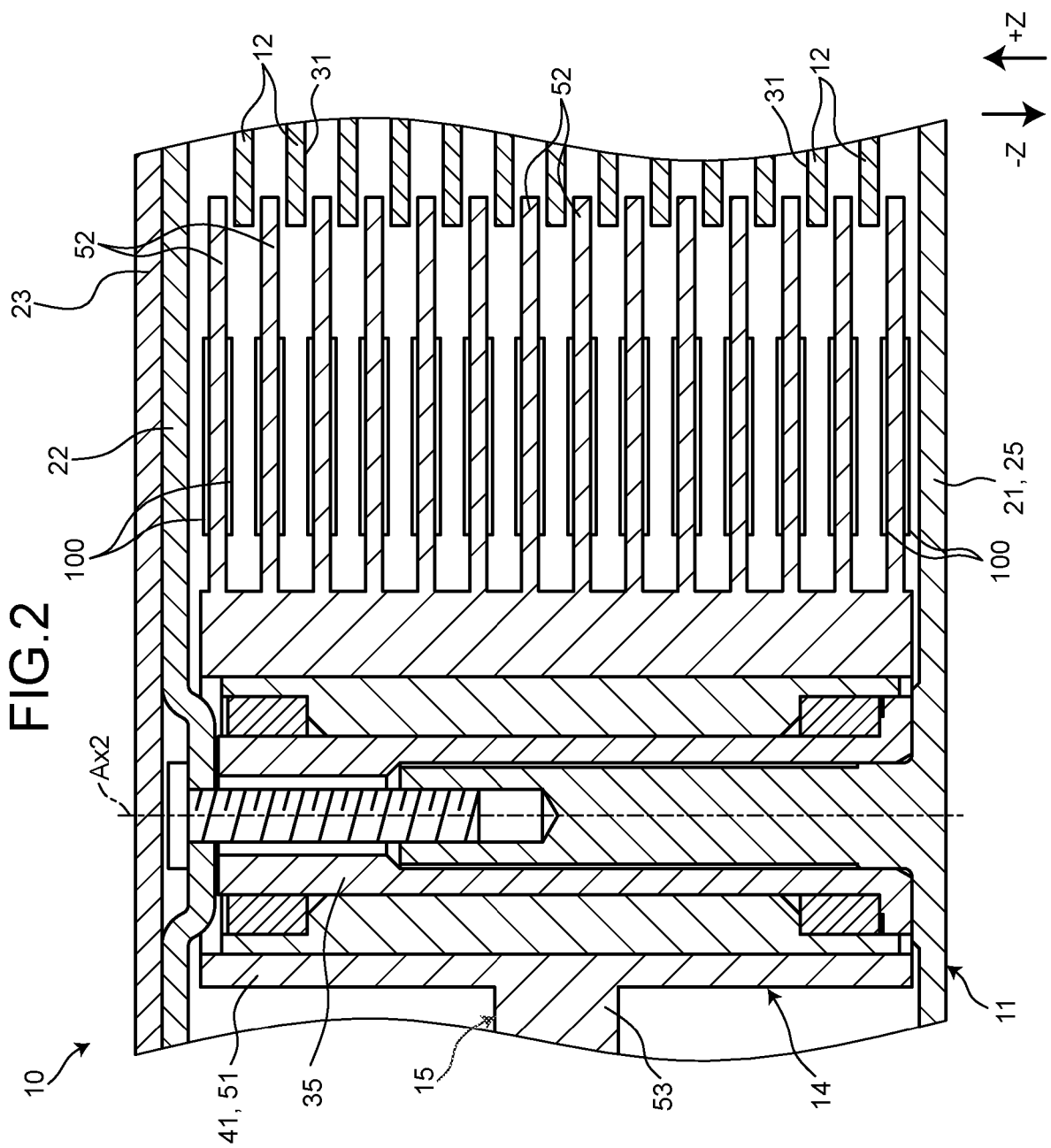
FIG. 2 is an exemplary cross-sectional view illustrating a part of the HDD according to the first embodiment.

FIG. 2 is an exemplary cross-sectional view illustrating a part of the HDD 10 according to the first embodiment. As illustrated in FIG. 2, in the present specification, a +Z direction and a −Z direction are defined for convenience. The +Z direction is one direction along the thickness of the HDD 10. The −Z direction is a direction opposite to the +Z direction.

The housing 11 includes a base 21, an inner cover 22, and an outer cover 23. Each of the base 21, the inner cover 22, and the outer cover 23 is made of, for example, a metal material such as an aluminum alloy.

The base 21 has a substantially rectangular parallelepiped box shape open in the +Z direction. As illustrated in FIG. 1, the plurality of magnetic disks 12, the spindle motor 13, the HSA 14, the VCM 15, and the ramp load mechanism 16 are housed inside the base 21.

The base 21 has a bottom wall 25 and a side wall 26. The bottom wall 25 has a substantially rectangular (quadrangular) plate shape arranged to be substantially orthogonal to the +Z direction. The side wall 26 protrudes in the substantially +Z direction from the edge of the bottom wall 25 and has a substantially rectangular frame shape. The bottom wall 25 and the side wall 26 are integrally formed.

The inner cover 22 is attached to an end of the side wall 26 in the +Z direction with screws, for example. The outer cover 23 covers the inner cover 22 and is attached to the end of the side wall 26 in the +Z direction by welding, for example.

The inner cover 22 is provided with a vent 27. The outer cover 23 is also provided with a vent 28. After the components are attached to the inside of the base 21 and the inner cover 22 and the outer cover 23 are attached to the base 21, the air inside the housing 11 is removed from the vents 27 and 28. Furthermore, the housing 11 is filled with a gas different from air.

The gas filled in the housing 11 is, for example, a low density gas having a density lower than that of air, an inert gas having low reactivity, or the like. For example, the housing 11 is filled with helium inside. Note that the housing 11 may be internally filled with another fluid. Further, the inside of the housing 11 may be maintained at vacuum, low pressure close to vacuum, or negative pressure lower than atmospheric pressure.

The vent 28 of the outer cover 23 is closed by a seal 29. The seal 29 airtightly seals the vent 28 and prevents the fluid filled in the housing 11 from leaking from the vent 28.

The plurality of magnetic disks 12 is arranged orthogonally to the +Z direction. The diameter of the magnetic disk 12 is, for example, about 3.5 inches. As illustrated in FIG. 2, the HDD 10 according to the present embodiment includes, for example, 13 magnetic disks 12. That is, the number of the magnetic disks 12 is 10 or more. Note that the diameter and the number of the magnetic disks 12 are not limited to this example.

Each of the magnetic disks 12 has, for example, at least one recording surface 31. The recording surface 31 is formed on at least one of the upper surface and the lower surface of the magnetic disk 12. In other words, each of the recording surfaces 31 is the surface of the magnetic disk 12 facing substantially the +Z direction or facing substantially the −Z direction. The recording surface 31 is a substantially flat surface orthogonal to the +Z direction. The recording surface 31 of the magnetic disk 12 has a magnetic recording layer formed thereon.

The spindle motor 13 of FIG. 1 supports a plurality of magnetic disks 12 stacked at intervals in the +Z direction or the −Z direction. The spindle motor 13 rotates the plurality of magnetic disks 12 around an axis Ax1 of the spindle motor 13. The axis Ax1 extends in the +Z direction and the −Z direction. The plurality of magnetic disks 12 is held by the hub of the spindle motor 13 by, for example, a clamp spring.

The HSA 14 is rotatably supported by a support shaft 35. The support shaft 35 is provided at a position separated from the magnetic disk 12 in a direction orthogonal to the axis Ax1. The support shaft 35 extends, for example, in the substantially +Z direction from the bottom wall 25 of the housing 11.

The HSA 14 can rotate about an axis Ax2. The axis Ax2 is an example of a rotation axis, and is a virtual axis extending in the +Z direction and the −Z direction. The axis Ax2 is, for example, the center of rotation of the HSA 14 and also the axis of the support shaft 35.

Hereinafter, the axial direction, the radial direction, and the circumferential direction are defined for convenience. The axial direction is a direction along the axis Ax2. In the present embodiment, the axis Ax2 extends in the +Z direction and the −Z direction. The axial direction thus includes the +Z direction and the −Z direction. The radial direction is orthogonal to the axis Ax2 and includes a plurality of directions orthogonal to the axis Ax2. The circumferential direction is a rotational direction around the axis Ax2 and includes a clockwise direction and a counterclockwise direction around the axis Ax2.

The HSA 14 includes a carriage 41, a plurality of head gimbal assemblies (HGA) 42, and a flexible printed circuit board (FPC) 43. As illustrated in FIG. 2, the carriage 41 includes an actuator block 51, a plurality of arms 52, and a frame 53.

The actuator block 51, the plurality of arms 52, and the frame 53 are integrally formed of, for example, an aluminum alloy. Note that the materials of the actuator block 51, the arm 52, and the frame 53 are not limited to this example.

The actuator block 51 is rotatably supported by the support shaft 35 via a bearing, for example. The plurality of arms 52 protrude radially outward from the actuator block 51. Note that the HSA 14 may be divided, and the arm 52 may protrude from each of the plurality of actuator blocks 51.

The plurality of arms 52 is arranged at intervals in the axial direction. Each of the arms 52 has a plate shape to enter the gap between the two adjacent magnetic disks 12. The plurality of arms 52 extend substantially in parallel.

In the present embodiment, the carriage 41 includes 14 arms 52. The number of the arms 52 is larger by one than the number of the magnetic disks 12. Note that the number of the arms 52 is not limited to this example.

The frame 53 protrudes from the actuator block 51 in a direction opposite to the direction in which the arm 52 protrudes. The frame 53 holds a voice coil of the VCM 15. The VCM 15 includes the voice coil, a pair of yokes, and a magnet provided on the yoke.

Figure 3:
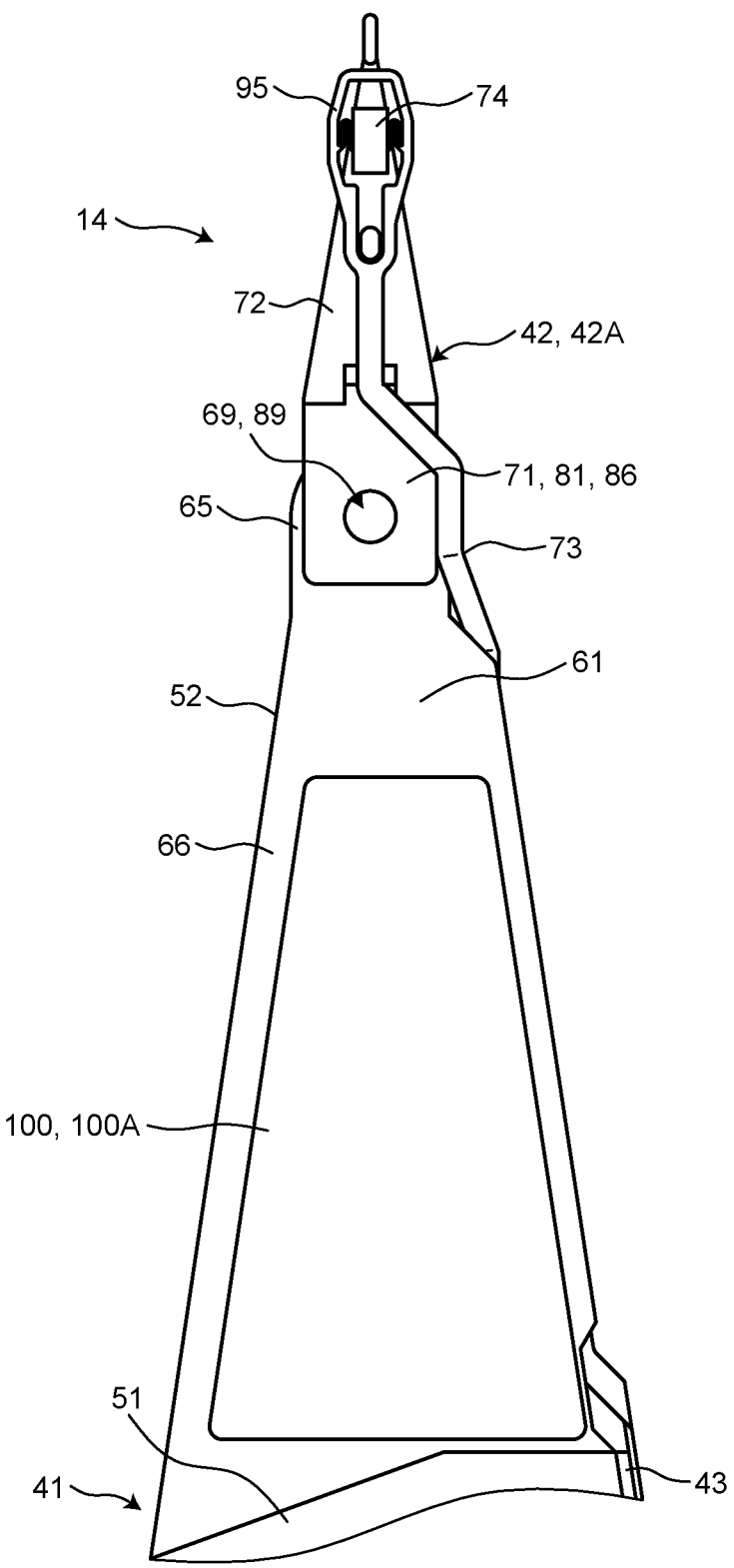
FIG. 3 is an exemplary plan view illustrating a part of a head stack assembly (HSA) of the first embodiment.
Figure 4:
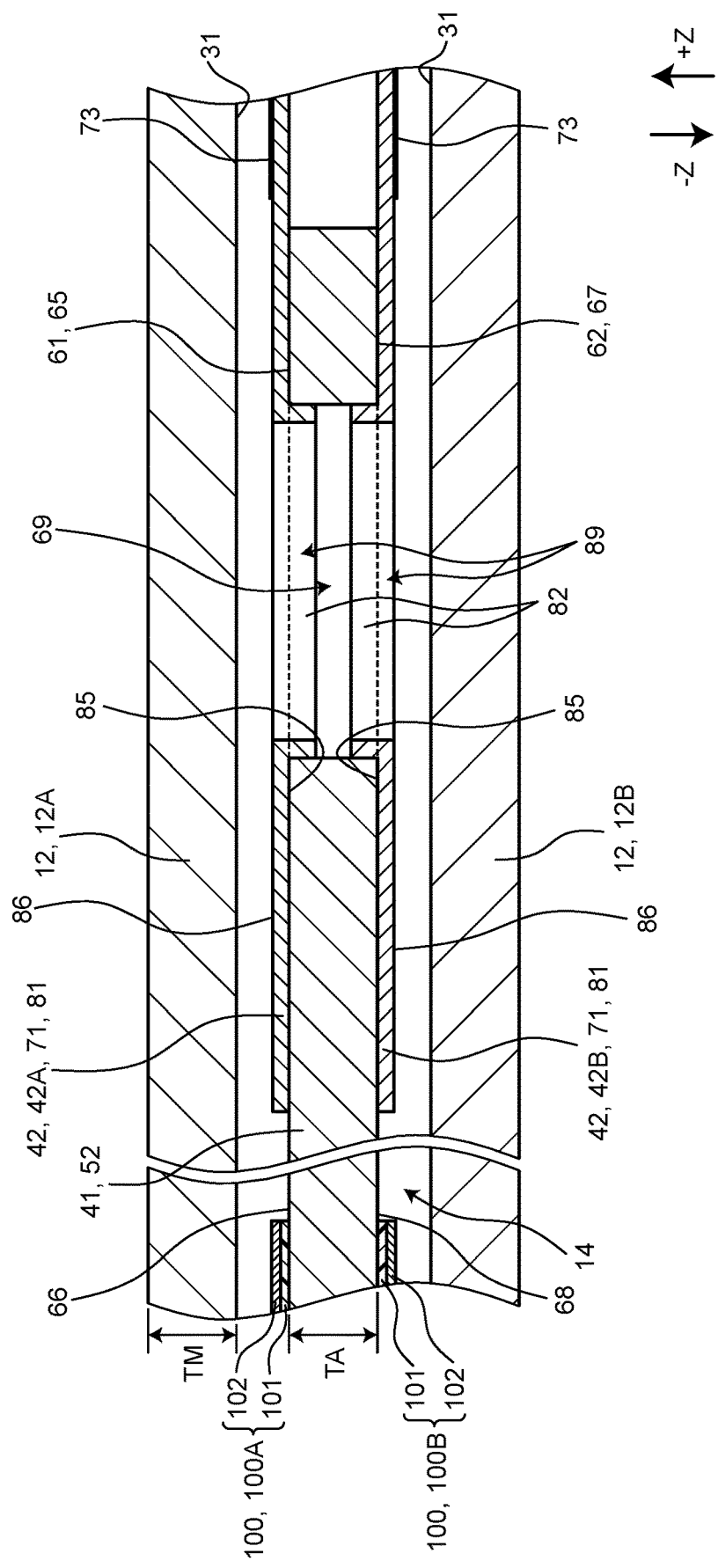
FIG. 4 is an exemplary cross-sectional view partially illustrating two magnetic disks and the HSA according to the first embodiment.

FIG. 3 is an exemplary plan view illustrating a part of the HSA 14 of the first embodiment. FIG. 4 is an exemplary cross-sectional view partially illustrating two magnetic disks 12 and the HSA 14 according to the first embodiment.

As described above, the arm 52 can enter the gap between the two adjacent magnetic disks 12. In the following description, as illustrated in FIG. 4, two adjacent magnetic disks 12 are individually referred to as magnetic disks 12A and 12B. The arm 52 located between the two magnetic disks 12A and 12B will be described in detail.

The magnetic disk 12A is one of the plurality of magnetic disks 12, and is an example of a first magnetic disk. The magnetic disk 12B is another one of the plurality of magnetic disks 12, and is an example of a second magnetic disk. The magnetic disk 12B is adjacent to the magnetic disk 12A and away from the magnetic disk 12A in the −Z direction.

In the axial direction, the arm 52 is located between the two magnetic disks 12A and 12B. The magnetic disk 12A is away from the arm 52 in the +Z direction. The magnetic disk 12B is away from the arm 52 in the −Z direction.

As illustrated in FIG. 4, each of the plurality of arms 52 has an upper surface 61 and a lower surface 62. The upper surface 61 is an example of a first flat surface. The lower surface 62 is an example of a second flat surface. Note that in this disclosure the terms "upper" and "lower" are defined with reference to, for example, FIGS. 2 and 4 for convenience, and are not intended to limit various conditions such as position or location, orientation, and usage mode.

The upper surface 61 is a flat surface and faces substantially the +Z direction. The lower surface 62 is opposite the upper surface 61. The lower surface 62 is a flat surface and faces substantially the −Z direction. Note that the upper surface 61 and the lower surface 62 may not be flat.

As illustrated in FIG. 3, the upper surface 61 has a first region 65 and a second region 66. The first region 65 is an example of a first fixation surface. The second region 66 is an example of a second fixation surface.

The first region 65 and the second region 66 are a part of the upper surface 61. When the arm 52 is located between the magnetic disks 12A and 12B, both of the first region 65 and the second region 66 at least partially face the recording surface 31 of the magnetic disk 12A.

The first region 65 is provided at the distal end of the arm 52. The second region 66 is located between the actuator block 51 and the first region 65. Since the upper surface 61 is a flat surface, the first region 65 and the second region 66 are provided at the same position (height) in the axial direction. Note that the position of the first region 65 and the position of the second region 66 may be different from each other in the axial direction.

As illustrated in FIG. 4, the lower surface 62 has a third region 67 and a fourth region 68. The third region 67 is an example of a fixation surface. The third region 67 and the fourth region 68 are a part of the lower surface 62. When the arm 52 is located between the magnetic disks 12A and 12B, both of the third region 67 and the fourth region 68 at least partially face the recording surface 31 of the magnetic disk 12B.

The third region 67 is included in the distal end of the arm 52. The third region 67 is opposite the first region 65 of the upper surface 61. The fourth region 68 is located between the actuator block 51 and the third region 67. The fourth region 68 is opposite the second region 66 of the upper surface 61.

Since the lower surface 62 is a flat surface, the third region 67 and the fourth region 68 are at the same position (in height) in the axial direction. Note that the position of the third region 67 and the position of the fourth region 68 may be different from each other in the axial direction.

The plurality of arms 52 is each provided with a through hole 69. The through hole 69 is a substantially circular hole penetrating the distal end of the arm 52 in the substantially Z direction. Thus, through hole 69 opens to the first region 65 of the upper surface 61 and the third region 67 of the lower surface 62.

The plurality of HGAs 42 is attached to the distal ends of the corresponding arms 52 and protrudes from the arms 52. The plurality of HGAs 42 is arranged at intervals in the axial direction.

As illustrated in FIG. 3, each of the plurality of HGAs 42 includes a base plate 71, a load beam 72, a flexure 73, and a magnetic head 74. The base plate 71 and the load beam 72 are made of, for example, stainless steel. Note that the materials of the base plate 71 and the load beam 72 are not limited to this example.

As illustrated in FIG. 4, the base plate 71 is attached to the first region 65 of the upper surface 61 or the third region 67 of the lower surface 62. In the following description, as illustrated in FIG. 4, the HGA 42 having the base plate 71 attached to the first region 65 is referred to as an HGA 42A. The HGA 42A is an example of a first head gimbal assembly. Further, the HGA 42 having the base plate 71 attached to the third region 67 is referred to as an HGA 42B. The HGA 42B is an example of a second head gimbal assembly.

For each element (the base plate 71, the load beam 72, the flexure 73, and the magnetic head 74) of the HGAs 42A and 42B, the feature common to the HGAs 42A and 42B will be described without mentioning in which of the HGAs 42A and 42B the element is included. On the other hand, for each element, features different from each other in the HGAs 42A and 42B are described individually.

The base plate 71, the load beam 72, the flexure 73, and the magnetic head 74 of the HGA 42A are examples of a first base plate, a first load beam, the substrate, and a first magnetic head, respectively. The base plate 71, the load beam 72, and the magnetic head 74 of the HGA 42B are examples of a second base plate, a second load beam, and a second magnetic head, respectively.

The base plate 71 includes a plate 81 and a boss 82. The plate 81 has a substantially rectangular shape. The plate 81 has an inner side surface 85 and an outer side surface 86. The inner side surface 85 of the HGA 42A is an example of a first surface. The outer side surface 86 of the HGA 42A is an example of a second surface. The inner side surface 85 of the HGA 42B is an example of a third surface. The outer side surface 86 of the HGA 42B is an example of a fourth surface.

The inner side surface 85 is substantially flat and faces the corresponding arm 52. The inner side surface 85 of the HGA 42A faces the first region 65 of the upper surface 61 and is supported by the first region 65. The inner side surface 85 of the HGA 42B faces the third region 67 of the lower surface 62 and is supported by the third region 67.

The outer side surface 86 is opposite the inner side surface 85. The outer side surface 86 is substantially flat and faces the recording surface 31 of the corresponding magnetic disk 12. The outer side surface 86 of the HGA 42A faces the recording surface 31 of the magnetic disk 12A. The outer side surface 86 of the HGA 42B faces the recording surface 31 of the magnetic disk 12B.

The boss 82 protrudes from the inner side surface 85 and is inserted into the through hole 69. The base plate 71 is provided with a through hole 89 that penetrates the plate 81 and the boss 82 in the substantially Z direction. The boss 82 is fixed to the inner surface of the through hole 69 by, for example, swaging. As a result, the base plate 71 of the HGA 42A is fixed to the first region 65. Further, the base plate 71 of the HGA 42B is fixed to the third region 67. Note that the base plate 71 may be fixed to the first region 65 or the third region 67 by another method.

The load beam 72 illustrated in FIG. 3 has a plate shape thinner than the plate 81 of the base plate 71. The load beam 72 is connected to the distal end of the base plate 71 and protrudes from the base plate 71.

Figure 5:
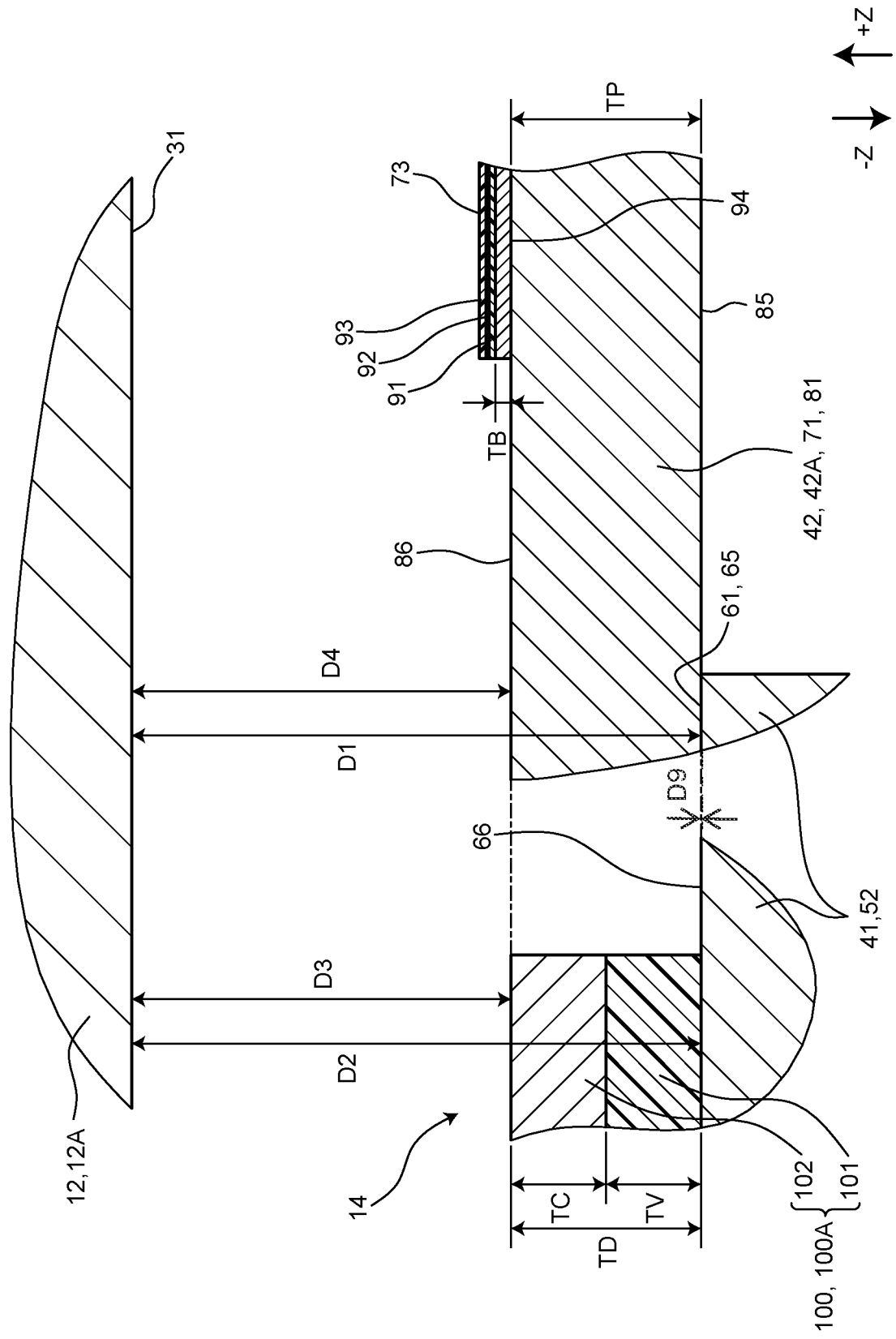
FIG. 5 is an exemplary cross-sectional view partially illustrating a magnetic disk, a head gimbal assembly (HGA), and an arm of the first embodiment.

FIG. 5 is an exemplary cross-sectional view partially illustrating the magnetic disk 12A, the HGA 42A, and the arm 52 of the first embodiment. As illustrated in FIG. 5, the flexure 73 has an elongated belt shape. The flexure 73 is, for example, a flexible substrate including a base layer 91, wiring 92, a cover layer 93, and a backing layer 94.

The base layer 91 is, for example, an insulating film made of polyimide. The wiring 92 is made of, for example, a conductor such as copper, and runs on one surface of the base layer 91. The cover layer 93 is, for example, an insulating film made of polyimide and covers a part of the wiring 92. The backing layer 94 is, for example, a metal plate made of stainless steel. The backing layer 94 is attached to the other surface of the base layer 91 with, for example, an adhesive.

As illustrated in FIG. 3, the flexure 73 includes a gimbal 95 (elastic support). The gimbal 95 is placed at one end of the flexure 73. The gimbal 95 is attached to the load beam 72 and is displaceable relative to the load beam 72.

The other end of the flexure 73 is connected to one end of the FPC 43, for example, on the actuator block 51. The other end of the FPC 43 is connected to a connector mounted on the bottom wall 25.

As illustrated in FIG. 4, a part of the flexure 73 is located between the magnetic disk 12 and the base plate 71. The part of the flexure 73 extends along the outer side surface 86 of the plate 81. Note that the flexure 73 is not limited to this example.

As illustrated in FIG. 3, the magnetic head 74 is mounted on the gimbal 95. For example, the terminal of the wiring 92 is exposed from the gimbal 95. An electrode of the magnetic head 74 is bonded to the terminal by, for example, soldering. Thus, the wiring 92 is electrically connected to the magnetic head 74. Further, the FPC 43 is electrically connected to the magnetic head 74 via the wiring 92.

The magnetic head 74 records and reproduces information on and from the recording surface 31 of the corresponding one of the magnetic disks 12. The magnetic head 74 of the HGA 42A reads and writes information from and to the magnetic disk 12A. The magnetic head 74 of the HGA 42B reads and writes information from and to the magnetic disk 12B.

The magnetic head 74 is supported by a protrusion of the load beam 72 via the flexure 73, for example. As a result, the magnetic head 74 mounted on the gimbal 95 can be displaced with respect to the load beam 72.

The VCM 15 illustrated in FIG. 1 rotates the carriage 41 about the axis Ax2. As the carriage 41 rotates, the HGA 42 attached to the arm 52 also rotates. The carriage 41 rotates about the axis Ax2 to move the magnetic head 74 to a desired position along the recording surface 31 of the magnetic disk 12.

When the magnetic head 74 reaches the outermost periphery of the magnetic disk 12 by the rotation of the carriage 41 by the VCM 15, the ramp load mechanism 16 holds the magnetic head 74. The magnetic head 74 held by the ramp load mechanism 16 is separated from the magnetic disk 12.

The PCB 17 is, for example, a rigid board such as a glass epoxy board, and is a multilayer board, a build-up board, or the like. The PCB 17 is disposed outside the housing 11 and is attached to the bottom wall 25 of the base 21.

Various electronic components such as a relay connector connected to the FPC 43, an interface (I/F) connector connected to a host computer, and a controller that controls the operation of the HDD 10 are mounted on the PCB 17. The relay connector is electrically connected to the FPC 43 via a connector provided on the bottom wall 25.

As illustrated in FIG. 4, the HDD 10 further includes a plurality of dampers 100. The plurality of dampers 100 are attached to the second region 66 of the upper surface 61 or the fourth region 68 of the lower surface 62. In the following description, as illustrated in FIG. 4, the damper 100 attached to the second region 66 is referred to as a damper 100A. The damper 100A is an example of a first damper. Further, the damper 100 attached to the fourth region 68 is referred to as a damper 100B. The damper 100B is an example of a second damper.

For each element of the dampers 100A and 100B, features common to the dampers 100A and 100B will be described without mentioning in which of the dampers 100A and 100B the element is included. On the other hand, for each element, features different from each other in the dampers 100A and 100B are described individually.

Each of the plurality of dampers 100 has a viscoelastic material (VEM) 101 and a constrained layer 102. The viscoelastic material 101 and the constrained layer 102 of the damper 100A are examples of a first viscoelastic material and a first member. The viscoelastic material 101 and the constrained layer 102 of the damper 100B are examples of a second viscoelastic material and a second member.

The viscoelastic material 101 is interposed between the arm 52 and the constrained layer 102, and adheres to the constrained layer 102 and the arm 52. The constrained layer 102 is attached to the viscoelastic material 101. The viscoelastic material 101 of the damper 100A is fixed to the second region 66. The viscoelastic material 101 of the damper 100B is fixed to the fourth region 68.

The constrained layer 102 has a plate shape. The constrained layer 102 is made of, for example, stainless steel and has higher rigidity than the viscoelastic material 101. In the projection plane viewed in the Z direction, the projected area of the viscoelastic material 101 is substantially equal to the projected area of the constrained layer 102.

For example, the server on which the HDD 10 is mounted includes a cooling fan. Vibration of the cooling fan may be transmitted to the HDD 10 through the rack. In this case, the arm 52 of the HDD 10 vibrates. Note that the HDD 10 can vibrate due to other factors.

As the arm 52 vibrates, the constrained layer 102 vibrates accordingly. As a result, the viscoelastic material 101 between the arm 52 and the constrained layer 102 is also deformed. The viscoelastic material 101, while being deformed, absorbs and converts vibration energy into heat. Thereby, the damper 100 can attenuate the vibration of the arm 52. For example, the damper 100 can lower a peak of vibration caused by the lateral vibration of the arm 52 in a bandwidth of near 8 kHz.

As described above, in the present embodiment, the base plate 71 of the HGA 42A and the viscoelastic material 101 of the damper 100A are fixed to the one flat upper surface 61. Further, the base plate 71 of the HGA 42B and the viscoelastic material 101 of the damper 100B are fixed to the one flat lower surface 62.

Hereinafter, dimensions in the present embodiment will be described. Each dimension described below is an example. Further, each dimension may also have tolerances. The thickness TM of the magnetic disk 12 in the axial direction illustrated in FIG. 4 is set to 0.45 mm to 0.55 mm. The thickness TM is, for example, about 0.5 mm.

The axial thickness TA of the arm 52 at the position where the base plate 71 is attached is set to 0.4 mm to 0.6 mm. The thickness TA corresponds to the distance between the first region 65 and the third region 67 in the axial direction. Note that in the present embodiment, the distance between the second region 66 and the fourth region 68 is also substantially equal to the thickness TA.

The thickness TP of the plate 81 illustrated in FIG. 5 is set to 0.1 mm or less. The thickness of the plate 81 corresponds to the distance between the inner side surface 85 and the outer side surface 86 in the axial direction. The thickness TB of the backing layer 94 of the flexure 73 illustrated in FIG. 5 is set to, for example, 10 μm to 15 μm. The thickness of the load beam 72 is set to 27 μm to 33 μm. The thickness of the load beam 72 is, for example, about 30 μm.

The axial thickness TV of the viscoelastic material 101 is, for example, about 50 μm. The axial thickness TC of the constrained layer 102 is, for example, about 50 μm. Thus, the axial thickness TD of the damper 100 is about 0.1 mm.

The upper surface 61 is flat. Because of this, the distance (hereinafter referred to as upper surface height difference) between the first region 65 and the second region 66 in the axial direction is 0 mm. In the axial direction, a distance D1 between the magnetic disk 12A and the first region 65 is substantially equal to a distance D2 between the magnetic disk 12A and the second region 66. Furthermore, the upper surface height difference is shorter than the thickness TV of the viscoelastic material 101. In addition, the upper surface height difference D9 is less than the thickness of the load beam 72 and less than the thickness TB of the backing layer 94.

The first region 65 and the second region 66 may be provided at different positions in the axial direction. Even in this case, the distance D1 is set to equal to or less than the distance D2. However, the distance D1 may be longer than the distance D2. In this case, the upper surface height difference is shorter than the thickness TV of the viscoelastic material 101. The upper surface height difference is set to 25 µm or less.

The thickness TP of the plate 81 and the thickness TD of the damper 100 are substantially the same. Specifically, in the axial direction, the difference between the thickness TP of the plate 81 and the thickness TD of the damper 100 is smaller than 10% of the thickness TP of the plate 81.

In the axial direction, a distance D3 between the magnetic disk 12A and the constrained layer 102 of the damper 100A and a distance D4 between the magnetic disk 12A and the base plate 71 of the HGA 42A are substantially the same. Specifically, the difference between the distance D3 and the distance D4 is smaller than 10% of the thickness TP of the plate 81.

Due to substantially the same distance D3 and D4, the gap between the magnetic disk 12 and the arm 52 to which the HGA 42 and the damper 100 are attached is substantially uniform. Thus, the magnetic disk 12 is unlikely to contact with the HGA 42 and the damper 100. In addition, the distances D3 and D4 can be shortened, increasing the number of the magnetic disks 12 that can be accommodated in the housing 11.

For example, the Small Form Factor Committee defined a 3.5-inch hard disk drive form factor SFF-8300, which specifies multiple maximum dimensions (hereinafter, referred to as defined dimensions) of the HDD in the Z direction. The specified dimensions defined in the SFF-8300 include 26.10 mm. In the HDD 10 according to the present embodiment, the thickness TA is set to about 0.4 mm to 0.6 mm, the thickness TM is set to about 0.500 mm, and each of the distances D3 and D4 is set to about 0.331 mm, so that the HDD 10 can have 10 or more magnetic disks 12 disposed within the range of the defined dimensions.

In the HDD 10 according to the first embodiment described above, the damper 100A includes the viscoelastic material 101 and the constrained layer 102 attached to the viscoelastic material 101. The constrained layer 102 has higher rigidity than the viscoelastic material 101. The arm 52 has the upper surface 61 configured to face the recording surface 31 of the magnetic disk 12A. The base plate 71 of the HGA 42A and the viscoelastic material 101 of the damper 100A are fixed to the upper surface 61. The constrained layer 102 vibrates along with the vibration of the arm 52, thereby deforming the viscoelastic material 101 between the constrained layer 102 and the upper surface 61. The viscoelastic material 101, while being deformed, absorbs and converts vibration energy into heat. Owing to such features, the damper 100A can attenuate the vibration of the arm 52. As such, the HDD 10 enables improvement in the accuracy of the positioning control of the magnetic head 74 and in the recording density of the magnetic disk 12.

Typically, the distal end of the arm is subjected to thinning processing. The base plate is attached to the thinner distal end. The damper is attached to a thicker part of the arm than the distal end. Such arrangement elongates the interval between the magnetic disks into which the arm and the damper are inserted, resulting in limiting the number of magnetic disks to mount on the HDD. Further, the damper is closer to the magnetic disk than the base plate, so that it may hit the magnetic disk at the time when the HDD is subject to impact, for example.

On the other hand, in the HDD 10 of the present embodiment, the base plate 71 and the viscoelastic material 101 are fixed to the one flat upper surface 61. This makes it easier to set substantially the same distance between the magnetic disk 12A and the damper 100A (distance D3) and between the magnetic disk 12A and the HGA 42A (distance D4). According to the HDD 10 of the present embodiment, it is thus possible to shorten the interval between the magnetic disks 12 and increase the number of magnetic disks 12 to mount on the HDD 10. Furthermore, the HDD 10 can lower the possibility that the damper 100A hits the magnetic disk 12.

The base plate 71 of the HGA 42A has the inner side surface 85 and the outer side surface 86. The inner side surface 85 faces the upper surface 61. The outer side surface 86 is opposite the inner side surface 85 and configured to face the recording surface 31 of the magnetic disk 12A. In the axial direction, the difference between the distance (thickness TP) between the inner side surface 85 and the outer side surface 86 and the thickness TD of the damper 100A is smaller than 10% of the thickness TP. Namely, the thickness TP of the base plate 71 and the thickness TD of the damper 100 are substantially the same. Thus, the distance (distance D3) between the magnetic disk 12A and the damper 100A and the distance (distance D4) between the magnetic disk 12A and the HGA 42A are substantially the same. Thereby, the HDD 10 of the present embodiment enables a shorter interval between the magnetic disks 12 and an increased number of magnetic disks 12 to mount on the HDD 10. Furthermore, the HDD 10 can lower the possibility that the damper 100A hits the magnetic disk 12.

In the axial direction, the difference between the distance D3 between the magnetic disk 12A and the constrained layer 102 and the distance D4 between the magnetic disk 12A and the base plate 71 is smaller than 10% of the thickness TP. That is, the distance D3 and the distance D4 are substantially the same. Consequently, the HDD 10 of the present embodiment enables a shorter interval between the magnetic disks 12 and an increased number of magnetic disks 12 to mount on the HDD 10. Furthermore, the HDD 10 can lower the possibility that the damper 100A hits the magnetic disk 12.

The damper 100B includes the viscoelastic material 101 and the constrained layer 102 attached to the viscoelastic material 101. The constrained layer 102 has higher rigidity than the viscoelastic material 101. The arm 52 has the lower surface 62 configured to face the recording surface 31 of the magnetic disk 12B. The base plate 71 of the HGA 42B and the viscoelastic material 101 of the damper 100B are fixed to the lower surface 62. Similar to the damper 100A, the damper 100B can attenuate the vibration of the arm 52. Owing to such features, the HDD 10 can implement further improvement in the accuracy of the positioning control of the magnetic head 74 and in the recording density of the magnetic disk 12. Further, according to the HDD 10 of the present embodiment, the base plate 71 and the viscoelastic material 101 are fixed to the one flat lower surface 62. This makes it easier to set substantially the same distance between the magnetic disk 12B and the damper 100B and between the magnetic disk 12B and the HGA 42B. As such, the HDD 10 of the present embodiment enables a further shorter interval between the magnetic disks 12 and an increased number of magnetic disks 12 to mount on the HDD 10. Furthermore, the HDD 10 can lower the possibility that the damper 100B hits the magnetic disk 12.

The arm 52 includes the first region 65 and the second region 66 both configured to face the recording surface 31 of the magnetic disk 12A. The base plate 71 is fixed to the first region 65 while the viscoelastic material 101 is fixed to the second region 66. In the axial direction, the distance D1 between the magnetic disk 12A and the first region 65 is equal to or less than the distance D2 between the magnetic disk 12A and the second region 66. When the distance D1 and the distance D2 are substantially the same, it can be easier to set substantially the same distance between the magnetic disk 12A and the damper 100A (distance D3) and between the magnetic disk 12A and the HGA 42A (distance D4). When the distance D1 is shorter than the distance D2, however, the damper 100A can be disposed further away from the magnetic disk 12A than the HGA 42A. In this case, even if the constrained layer 102 of the damper 100A vibrates in the axial direction, for example, the damper 100A is less likely to contact with the magnetic disk 12A. In this manner, the HDD 10 of the present embodiment enables a shorter interval between the magnetic disks 12 and an increased number of magnetic disks 12 to mount on the HDD 10. Furthermore, the HDD 10 can lower the possibility that the damper 100A hits the magnetic disk 12.

The axial distance between the first region 65 and the second region 66 is less than the thickness of the load beam 72. The load beam of the HGA typically has a thin thickness. That is, the first region 65 and the second region 66 form substantially the same plane. This makes it easier to set substantially the same distance between the magnetic disk 12A and the damper 100A (distance D3) and between the magnetic disk 12A and the HGA 42A (distance D4). As such, the HDD 10 of the present embodiment can implement a shorter interval between the magnetic disks 12 and an increased number of magnetic disks 12 to mount on the HDD 10. Furthermore, the HDD 10 can lower the possibility that the damper 100A hits the magnetic disk 12.

The HGA 42A includes the flexure 73 on which the magnetic head 74 is mounted. The flexure 73 includes the insulating base layer 91, the wiring 92, and the backing layer 94. The wiring 92 runs on one surface of the base layer 91 and is electrically connected to the magnetic head 74. The backing layer 94 is attached to the other surface of the base layer 91. The axial distance between the first region 65 and the second region 66 is less than the thickness of the backing layer 94. The metal plate of the flexure of the HGA typically has a thin thickness. Thus, the first region 65 and the second region 66 form substantially the same plane. As such, it can be easier to set substantially the same distance between the magnetic disk 12A and the damper 100A (distance D3) and between the magnetic disk 12A and the HGA 42A (distance D4).

Consequently, the HDD 10 of the present embodiment can implement a shorter interval between the magnetic disks 12 and an increased number of magnetic disks 12 to mount on the HDD 10. Furthermore, the HDD 10 can lower the possibility that the damper 100A hits the magnetic disk 12.

In the axial direction, the distance between the first region 65 and the second region 66 is shorter than the thickness TV of the viscoelastic material 101. The viscoelastic material of the damper to be attached to the arm typically has a thin thickness. Thus, the first region 65 and the second region 66 form substantially the same plane. It can be therefore easier to set substantially the same distance between the magnetic disk 12A and the damper 100A (distance D3) and between the magnetic disk 12A and the HGA 42A (distance D4). Consequently, the HDD 10 of the present embodiment can implement a shorter interval between the magnetic disks 12 and an increased number of magnetic disks 12 to mount on the HDD 10. Furthermore, the HDD 10 can lower the possibility that the damper 100A hits the magnetic disk 12.

Second Embodiment

Hereinafter, a second embodiment will be described with reference to FIG. 6. In the following description of the embodiment, components having functions similar to those of the components already described are denoted by the same reference numerals as those of the components already described, and the description thereof may be omitted. In addition, the plurality of components denoted by the same reference numerals do not necessarily have all the functions and properties in common, and may have different functions and properties according to each embodiment.

Figure 6:
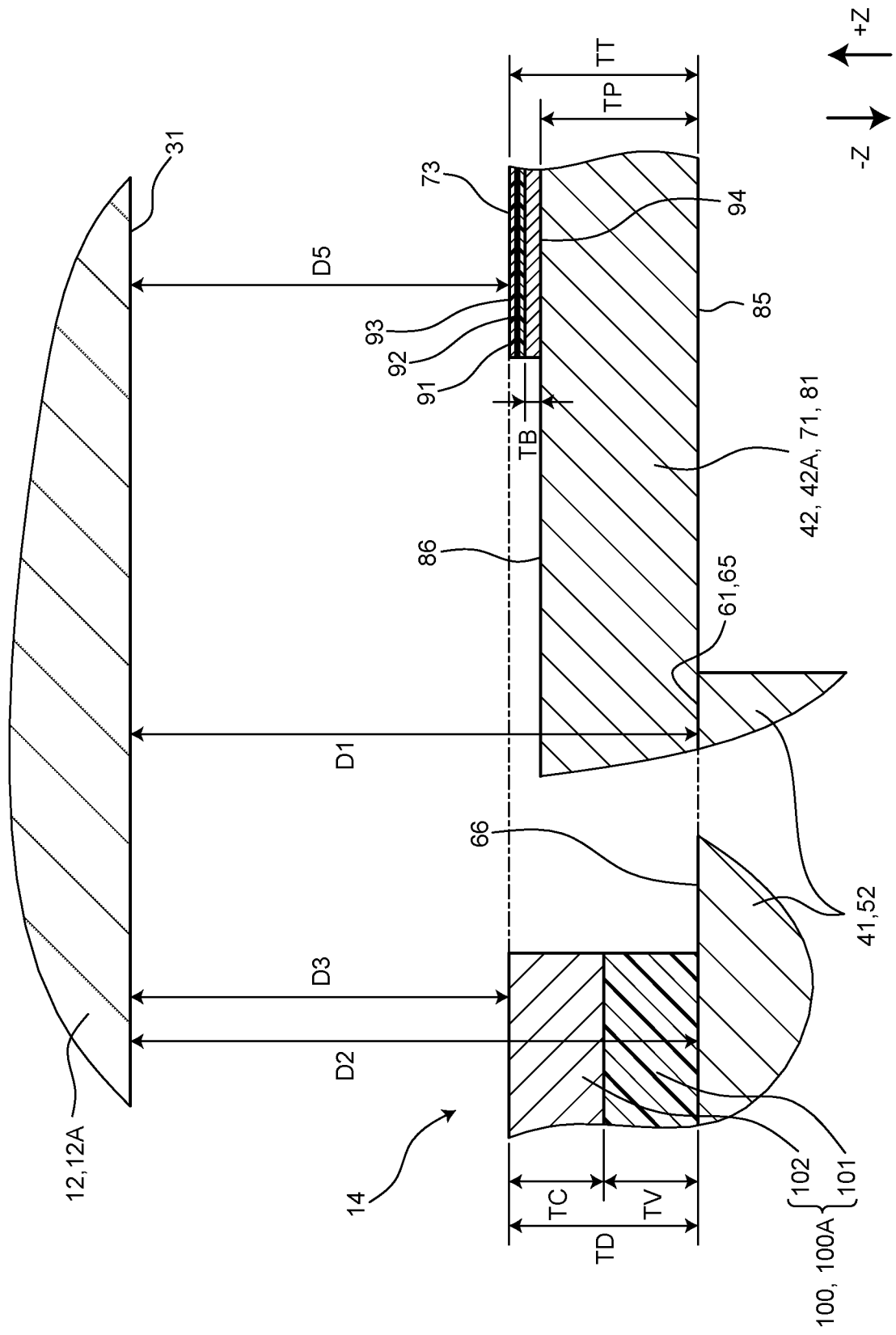
FIG. 6 is an exemplary cross-sectional view partially illustrating a magnetic disk, an HGA, and an arm according to a second embodiment.

As illustrated in FIG. 6, in the axial direction, a total thickness TT of the thickness TP of the plate 81 and the thickness of the flexure 73 is substantially the same as the thickness TD of the damper 100. Specifically, the difference between the total thickness TT and the thickness TD is less than 10% of the thickness TP.

In the axial direction, the distance D3 is substantially the same as the distance D5 between the magnetic disk 12A and the flexure 73 of the HGA 42A. The distance D5 is a distance between a portion of the flexure 73 between the magnetic disk 12A and the base plate 71, and the magnetic disk 12A, and is a minimum distance between the magnetic disk 12A and the flexure 73. Specifically, the difference between the distance D3 and the distance D5 is smaller than 10% of the thickness TP of the plate 81.

In the HDD 10 according to the second embodiment described above, the HGA 42A includes the flexure 73 on which the magnetic head 74 is mounted. In the axial direction, the difference between the thickness TD of the damper 100A and the total thickness TT of the thickness TP and the thickness of the flexure 73 is smaller than 10% of the thickness TP. That is, the total thickness TT and the thickness TD are substantially the same. Because of this, the distance (distance D3) between the magnetic disk 12A and the damper 100A and the distance (distance D5) between the magnetic disk 12A and the HGA 42A are substantially the same. As such, the HDD 10 of the present embodiment can implement a shorter interval between the magnetic disks 12 and an increased number of magnetic disks 12 to mount on the HDD 10. Furthermore, the HDD 10 can lower the possibility that the flexure 73 vibrates during non-operation or moves in operation to hit the magnetic disk 12, for example.

In the axial direction, the difference between the distance D3 between the magnetic disk 12A and the constrained layer 102 and the minimum distance (distance D5) between the magnetic disk 12A and the flexure 73 is smaller than 10% of the thickness TP. That is, the distance D3 and the distance D5 are substantially the same. As such, the HDD 10 of the present embodiment can implement a shorter interval between the magnetic disks 12 and an increased number of magnetic disks 12 to mount on the HDD 10. Furthermore, the HDD 10 can lower the possibility that the damper 100A hits the magnetic disk 12.

Third Embodiment

Figure 7:
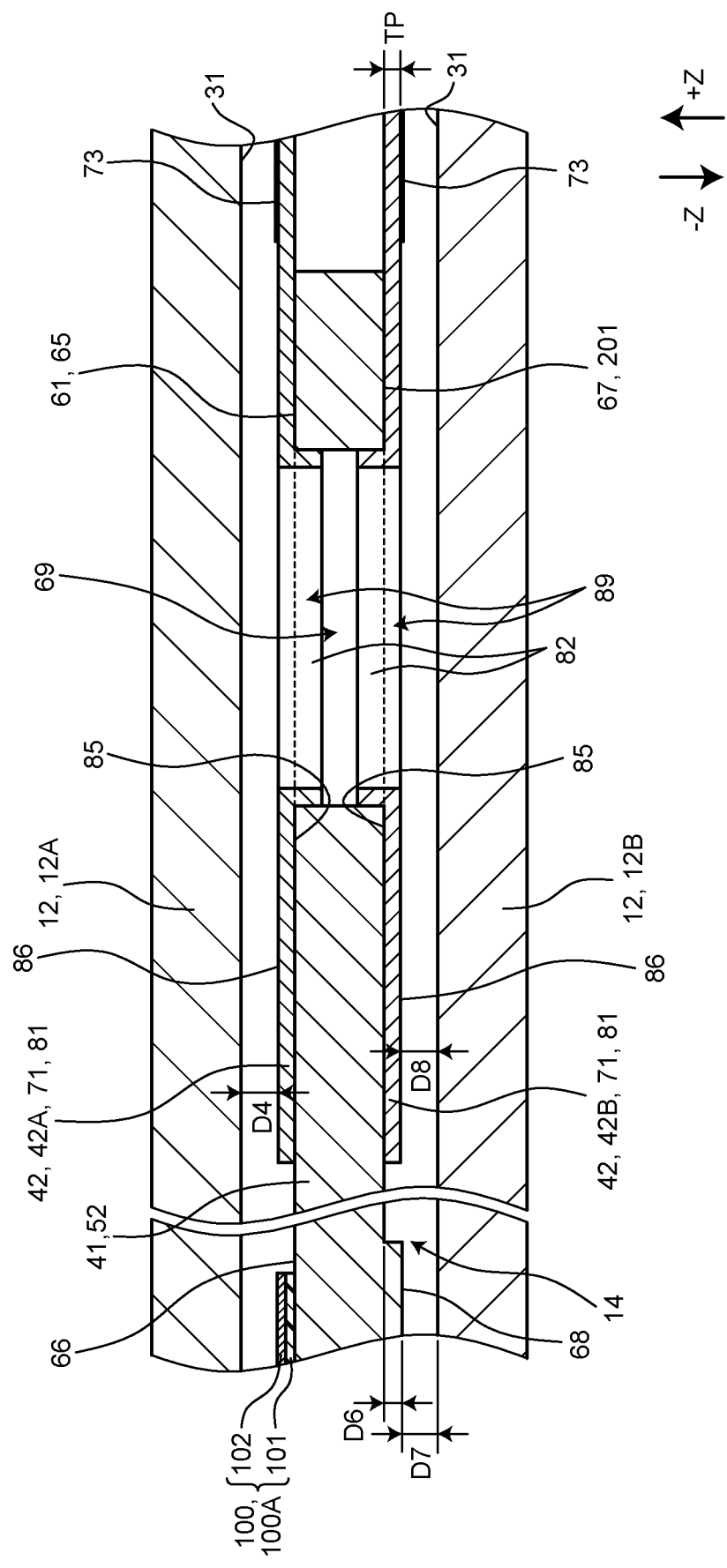
FIG. 7 is an exemplary cross-sectional view partially illustrating two magnetic disks and an HSA according to a third embodiment.

Hereinafter, a third embodiment will be described with reference to FIGS. 7 and 8. FIG. 7 is an exemplary cross-sectional view partially illustrating two magnetic disks 12 and the HSA 14 according to the third embodiment. As illustrated in FIG. 7, in the third embodiment, the damper 100 is fixed to the second region 66 and is not fixed to the fourth region 68.

In the third embodiment, the arm 52 has a lower surface 201 instead of the lower surface 62. The lower surface 201 is substantially equal to the lower surface 62 except as described below. The fourth region 68 of the lower surface 201 is closer to the magnetic disk 12B than the third region 67 in the axial direction. The fourth region 68 is an example of an outer surface.

In the arm 52, the thickness of the portion having the third region 67 is thinner than the thickness of the portion having the fourth region 68. For example, the distal end of the arm 52 is cut to form the third region 67 in the arm 52. Note that the arm 52 is not limited to this example.

In the axial direction, a distance D6 between the third region 67 and the fourth region 68 is substantially the same as the thickness TP of the plate 81 of the HGA 42B. Specifically, in the axial direction, the difference between the distance D6 and the thickness TP of the plate 81 is smaller than 10% of the thickness TP.

In the axial direction, a distance D7 between the magnetic disk 12B and the fourth region 68 and a distance D8 between the magnetic disk 12B and the base plate 71 of the HGA 42B are substantially the same. Specifically, the difference between the distance D7 and the distance D8 is smaller than 10% of the thickness TP of the plate 81. Note that the distance D8 is substantially the same as the distance D4.

Figure 8:
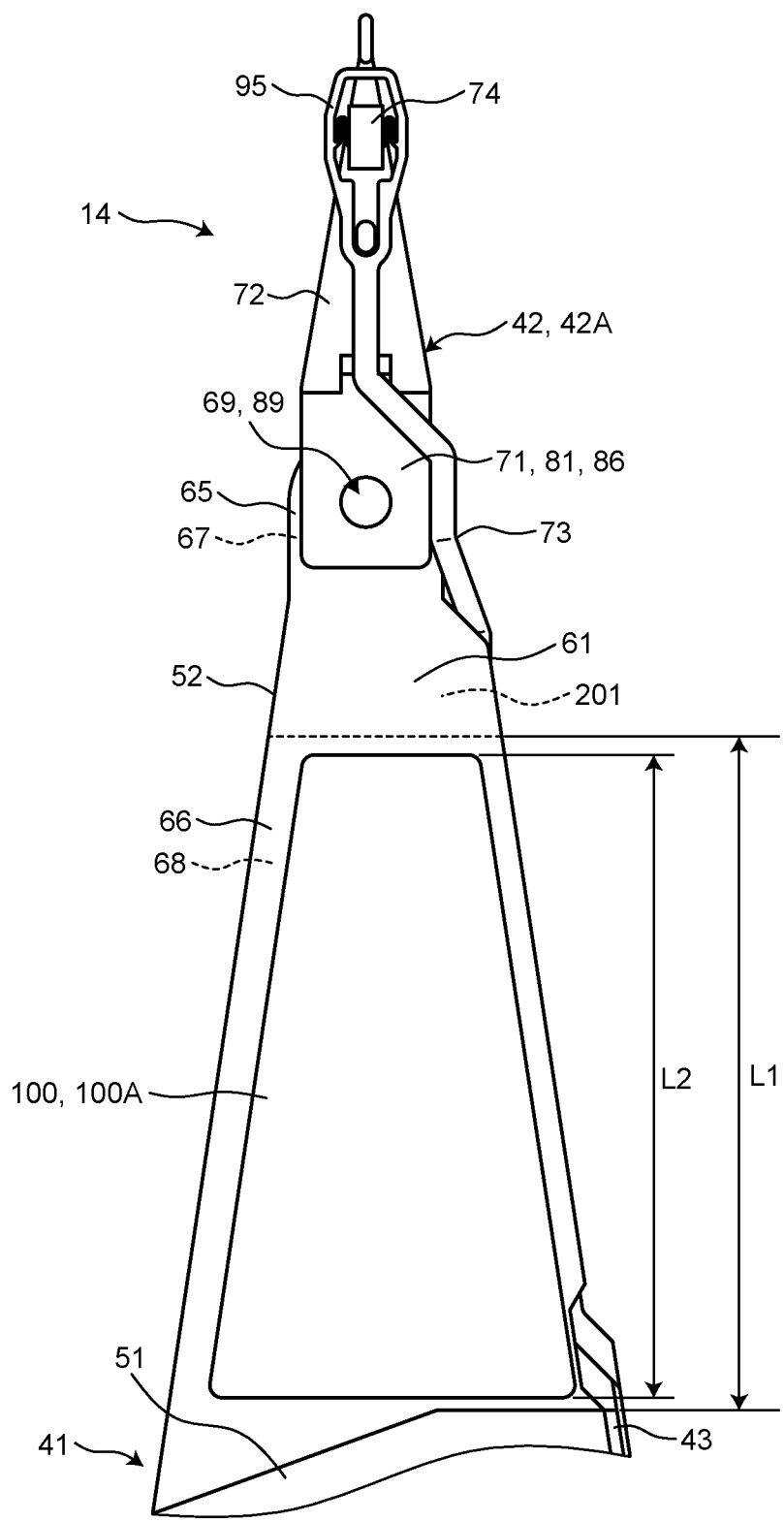
FIG. 8 is an exemplary plan view illustrating a part of the HSA of the third embodiment.

FIG. 8 is an exemplary plan view illustrating a part of the HSA 14 of the third embodiment. As illustrated in FIG. 8, the length L1 of the fourth region 68 is longer than the length L2 of the damper 100A in the longitudinal direction of the HGA 42 and the arm 52. The longitudinal direction is a direction from the axis Ax2 toward the magnetic head 74 and orthogonal to the axis Ax2.

In the HDD 10 of the third embodiment described above, the arm 52 includes the third region 67 and the fourth region 68. The third region 67 and the fourth region 68 are opposite the upper surface 61 and configured to face the recording surface 31 of the magnetic disk 12B. The base plate 71 of the HGA 42B is fixed to the third region 67. The fourth region 68 is closer to the magnetic disk 12B than the third region 67 in the axial direction. In other words, in the arm 52, the part having the third region 67 has a thinner thickness while the part having the fourth region 68 has a thicker thickness. Owing to the thicker-thickness part, the arm 52 can be improved in rigidity to suppress vibration.

In the direction from the axis Ax2 toward the magnetic head 74 and orthogonal to the axis Ax2, the length L1 of the fourth region 68 is longer than the length L2 of the damper 100A. That is, the thicker-thickness part of the arm 52 is larger in size than the damper 100A. Consequently, the arm 52 can be improved in rigidity to suppress vibration.

The base plate 71 of the HGA 42B has the inner side surface 85 and the outer side surface 86. The inner side surface 85 faces the third region 67. The outer side surface 86 is opposite the inner side surface 85 and configured to face the recording surface 31 of the magnetic disk 12B. In the axial direction, the difference between the distance D6 between the third region 67 and the fourth region 68 and the distance (thickness TP) between the inner side surface 85 and the outer side surface 86 is less than 10% of the thickness TP. That is, the distance D6 and the thickness TP are substantially the same. Because of this, the distance D7 between the magnetic disk 12B and the fourth region 68 of the arm 52 is substantially the same as the distance (distance D8) between the magnetic disk 12B and the HGA 42B. As such, the HDD 10 of the present embodiment can implement a shorter interval between the magnetic disks 12 and an increased number of magnetic disks 12 to mount on the HDD 10. Furthermore, the HDD 10 can lower the possibility that the fourth region 68 hits the magnetic disk 12. In addition, the HDD 10 according to the third embodiment can be reduced in the number of dampers 100 as compared with the HDD 10 according to the first embodiment, leading to cost reduction.

In the above description, "to prevent (to be prevented)" is defined as, for example, preventing the occurrence of an event, an action, or an influence, or reducing the degree of the event, the action, or the influence.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
   a plurality of magnetic disks each having a recording surface;
   a first head gimbal assembly including
      a first magnetic head configured to read and write information from and to a first magnetic disk of the plurality of magnetic disks,
      a first load beam supporting the first magnetic head, and
      a first base plate connected to the first load beam;
   a first damper including
      a first viscoelastic material, and
      a first member attached to the first viscoelastic material and having higher rigidity than the first viscoelastic material; and
   a carriage configured to rotate about a rotation axis to move the first magnetic head along the recording surface of the first magnetic disk, the carriage including an arm, and
      a first flat surface of the arm, the first flat surface configured to face the recording surface of the first magnetic disk and to which the first base plate and the first viscoelastic material are fixed, wherein
   the first base plate includes
      a first surface facing the first flat surface, and
      a second surface opposite the first surface and formed to face the recording surface of the first magnetic disk, and
      in a direction along the rotation axis, a distance between the first surface and the second surface is 0.1 mm or less.

2. The disk device according to claim 1, wherein
   in a direction along the rotation axis, a difference between
      a thickness of the first damper and a distance between the first surface and the second surface is smaller than 10% of the distance between the first surface and the second surface.

3. The disk device according to claim 1, wherein
   in a direction along the rotation axis, a difference in distance between the first magnetic disk and the first member and between the first magnetic disk and the first base plate is smaller than 10% of a distance between the first surface and the second surface.

4. The disk device according to claim 1, wherein
the first head gimbal assembly includes a substrate on which the first magnetic head is mounted, and
in a direction along the rotation axis, a difference between a thickness of the first damper and a sum of a thickness of the substrate and a distance between the first surface and the second surface is smaller than 10% of the distance between the first surface and the second surface.

5. The disk device according to claim 1, wherein
the first head gimbal assembly includes a substrate on which the first magnetic head is mounted, and
in a direction along the rotation axis, a difference between a distance between the first magnetic disk and the first member and a minimum distance between the first magnetic disk and the substrate is smaller than 10% of a distance between the first surface and the second surface.

6. The disk device according to claim 1, further comprising:
a second head gimbal assembly including
a second magnetic head configured to read and write information from and to a second magnetic disk of the plurality of magnetic disks, the second magnetic disk being adjacent to the first magnetic disk,
a second load beam supporting the second magnetic head, and
a second base plate connected to the second load beam; and
a second damper including
a second viscoelastic material, and
a second member attached to the second viscoelastic material and having higher rigidity than the second viscoelastic material, wherein
the arm has a second flat surface opposite the first flat surface and configured to face the recording surface of the second magnetic disk, and
the second base plate and the second viscoelastic material are fixed to the second flat surface.

7. The disk device according to claim 1, further comprising:
a second head gimbal assembly including
a second magnetic head configured to read and write information from and to a second magnetic disk of the plurality of magnetic disks, the second magnetic disk being adjacent to the first magnetic disk,
a second load beam supporting the second magnetic head, and
a second base plate connected to the second load beam, wherein
the arm includes
a fixation surface opposite the first flat surface and configured to face the recording surface of the second magnetic disk, and
an outer surface opposite the first flat surface, configured to face the recording surface of the second magnetic disk, and closer to the second magnetic disk than the fixation surface in a direction along the rotation axis, and
the second base plate is fixed to the fixation surface.

8. The disk device according to claim 7, wherein
in a direction from the rotation axis toward the first magnetic head and orthogonal to the rotation axis, the outer surface is longer in length than the first damper.

9. The disk device according to claim 7, wherein
the second base plate includes
a third surface facing the fixation surface, and
a fourth surface opposite the third surface and configured to face the recording surface of the second magnetic disk, and
in the direction along the rotation axis, a difference in distance between the fixation surface and the outer surface and between the third surface and the fourth surface is smaller than 10% of the distance between the third surface and the fourth surface.

10. The disk device according to claim 1, wherein
the number of the plurality of magnetic disks is 10 or more.

11. The disk device according to claim 1, wherein
in a direction along the rotation axis, a thickness of the arm at a position of the first base plate attached is 0.4 mm to 0.6 mm.

12. A disk device comprising:
a plurality of magnetic disks each having a recording surface;
a first head gimbal assembly including
a first magnetic head configured to read and write information from and to a first magnetic disk of the plurality of magnetic disks,
a first load beam supporting the first magnetic head, and
a first base plate connected to the first load beam;
a first damper including
a first viscoelastic material, and
a first member attached to the first viscoelastic material and having higher rigidity than the first viscoelastic material; and
a carriage configured to rotate about a rotation axis to move the first magnetic head along the recording surface of the first magnetic disk, the carriage including an arm,
a first fixation surface of the arm, the first fixation surface configured to face the recording surface of the first magnetic disk and to which the first base plate is fixed, and
a second fixation surface of the arm, the second fixation surface configured to face the recording surface of the first magnetic disk and to which the first viscoelastic material is fixed, wherein in a direction along the rotation axis, a distance between the first magnetic disk and the first fixation surface is less than or equal to a distance between the first magnetic disk and the second fixation surface.

13. The disk device according to claim 12, wherein
in the direction along the rotation axis, a distance between the first fixation surface and the second fixation surface is shorter than a thickness of the first load beam.

14. The disk device according to claim 12, wherein
the first head gimbal assembly includes a substrate on which the first magnetic head is mounted,
the substrate includes
an insulating base layer,
wiring on one surface of the base layer, electrically connected to the first magnetic head, and
a metal plate attached to the other surface of the base layer, and
in the direction along the rotation axis, a distance between the first fixation surface and the second fixation surface is shorter than a thickness of the metal plate.

15. The disk device according to claim 12, wherein
in the direction along the rotation axis, the distance between the first fixation surface and the second fixation surface is 25 μm or less.

16. A disk device comprising:
a plurality of magnetic disks each having a recording surface;
a first head gimbal assembly including
 a first magnetic head configured to read and write information from and to a first magnetic disk of the plurality of magnetic disks,
 a first load beam supporting the first magnetic head, and
 a first base plate connected to the first load beam;
a first damper including
 a first viscoelastic material, and
 a first member attached to the first viscoelastic material and having higher rigidity than the first viscoelastic material; and
a carriage configured to rotate about a rotation axis to move the first magnetic head along the recording surface of the first magnetic disk, the carriage including an arm,
 a first fixation surface of the arm, the first fixation surface configured to face the recording surface of the first magnetic disk and to which the first base plate is fixed, and
 a second fixation surface of the arm, the second fixation surface configured to face the recording surface of the first magnetic disk and to which the first viscoelastic material is fixed, wherein in a direction along the rotation axis, a distance between
the first fixation surface and the second fixation surface is shorter than a thickness of
the first viscoelastic material.

* * * * *